(12) United States Patent
Zapata et al.

(10) Patent No.: US 8,558,409 B2
(45) Date of Patent: Oct. 15, 2013

(54) HIGH VOLTAGE SWITCHGEAR POWER SUPPLY ARRANGEMENT FOR A WIND TURBINE FACILITY

(75) Inventors: Roberto Zapata, Arhus N (DK); Rasmus Peter Jensen, Gjern (DK)

(73) Assignee: Vestas Wind Systems A/S, Randers SV (DK)

( * ) Notice: Subject to any disclaimer, the term of this patent is extended or adjusted under 35 U.S.C. 154(b) by 380 days.

(21) Appl. No.: 12/833,407

(22) Filed: Jul. 9, 2010

(65) Prior Publication Data

US 2012/0007444 A1 Jan. 12, 2012

(51) Int. Cl.
*H02J 1/00* (2006.01)

(52) U.S. Cl.
USPC .................................. 307/85; 290/44; 290/55

(58) Field of Classification Search
USPC ......................................... 307/66, 85; 290/44
See application file for complete search history.

(56) References Cited

U.S. PATENT DOCUMENTS

| | | | |
|---|---|---|---|
| 6,747,370 B2 * | 6/2004 | Abe ................................. | 307/66 |
| 6,853,094 B2 * | 2/2005 | Feddersen et al. .............. | 290/44 |
| 2006/0214428 A1 * | 9/2006 | Altemark et al. ................ | 290/44 |
| 2008/0224541 A1 * | 9/2008 | Fukuhara ......................... | 307/48 |
| 2009/0079193 A1 * | 3/2009 | Nielsen et al. .................. | 290/44 |
| 2009/0224607 A1 | 9/2009 | Kjaer et al. | |
| 2009/0299697 A1 * | 12/2009 | Hamby et al. ................. | 702/182 |

FOREIGN PATENT DOCUMENTS

| | | |
|---|---|---|
| CN | 101624969 A | 1/2010 |
| DE | 19546628 A1 | 6/1997 |
| DE | 29722109 U1 | 3/1998 |
| JP | 2006-113465 A | 4/2006 |
| RU | 2382900 C1 | 2/2010 |
| WO | 2004114493 A2 | 12/2004 |
| WO | 2007003183 A1 | 1/2007 |
| WO | 2009/062535 A1 | 5/2009 |
| WO | 2010000315 A1 | 1/2010 |

OTHER PUBLICATIONS

European Patent Office, International Search Report and Written Opinion issued in related application serial No. PCT/DK2011/050263 dated Oct. 26, 2011.
Danish Patent and Trademark Office, Search Report issued in related Danish application No. PA 2010 70322 dated Feb. 22, 2011.
Danish Patent and Trademark Office, Office Action issued in related Danish application No. PA 2010 70322 dated Feb. 22, 2011.

* cited by examiner

*Primary Examiner* — Jared Fureman
*Assistant Examiner* — Alfonso Perez Borroto
(74) *Attorney, Agent, or Firm* — Patterson & Sheridan, LLP

(57) ABSTRACT

The present invention relates to a wind turbine facility power supplying arrangement for supplying electrical power to at least a switchgear being able to isolate the wind turbine facility from an electrical network, the wind turbine facility power supplying arrangement comprising a first electrical power supply path able to be provide electrical power to the switchgear and a first power switch able to break said first electrical supply path and able to be controlled for opening and closing. The wind turbine facility power supplying arrangement contains at least another parallel electrical power supply path able to provide electrical power to the switchgear, said parallel electrical supply path been breakable with at least another respective parallel power switch, said parallel power switch being controllable for opening and closing.

13 Claims, 4 Drawing Sheets

HIGH VOLTAGE SWITCHGEAR POWER SUPPLY ARRANGEMENT FOR A WIND TURBINE FACILITY

FIELD OF THE INVENTION

The present invention relates notably to a wind turbine facility power supplying arrangement for supplying electrical power to switchgear being able to isolate a wind turbine facility from an electrical network. It also relates to a wind turbine facility switchgear power supply controlling system, to a wind turbine facility switchgear system and to a wind turbine facility.

BACKGROUND OF THE INVENTION

A wind turbine converts the energy of the wind into electrical power thanks to an electrical generator that transforms mechanical energy in electrical energy.

Wind turbine facilities (either one turbine or a set of wind turbines) are connected to an electrical grid to which they supply the electrical power they produce. This grid may be for example a public electrical grid that supplies electricity to a large area (for example a country), a private grid (for example a house or a community) or the internal grid of a wind turbine park.

Wind turbines facilities may need to be disconnected from the grid they are connected to, notably for safety reasons. This disconnection may be done by a so-called switchgear. It is therefore important to get a reliable and quick disconnection when needed.

DESCRIPTION OF THE INVENTION

In an embodiment of the invention, there is provided a wind turbine facility power supplying arrangement for supplying or giving electrical power to a switchgear, said switchgear being able to isolate the wind turbine facility from an electrical network.

The wind turbine facility power supplying arrangement comprises:
  a first electrical power supply path able to provide electrical power to the switchgear, and
  a first power switch able to break said first electrical supply path.

In said embodiment of the invention, said wind turbine facility power supply arrangement contains at least another parallel electrical power supply path able to provide electrical power to the switchgear. And said parallel electrical supply path is breakable with at least another respective parallel power switch.

The term wind turbine facility should be understood broadly and covers, thus, for example a single wind turbine or, alternatively, a group of wind turbines forming a wind power plant.

Thanks to the parallel electrical power supply path and the respective parallel power switch, the power supply arrangement is able to provide electrical power to a wind turbine facility switchgear in a redundant manner, i.e. the power supply arrangement is able to supply power to a wind turbine facility switchgear even if one of the power supply paths is broken when it should be conductive.

In an embodiment of the invention, the wind turbine facility power supplying arrangement also comprises a plurality of control switches arranged in a series control circuit, each of the control switches being arranged to signal a state of operation of respectively one of the power switches.

As the plurality of control switches are arranged in a series control circuit, the opening of any of the control switches breaks the control circuit.

In another embodiment, each control switch of the wind turbine facility power supplying arrangement is arranged to signal a state of operation of respectively one of the power switches so as to be open when the respective power switch is open and closed when the respective power switch is closed.

If for example, when the power supply arrangement is in operation, each of the control switches is closed when its respective power switch is also closed, and each of the control switches is open when its respective power switch is also open, then the series control circuit will be broken if any of the power switches is not closed.

Therefore, when the power switches are ordered to close, if one of them at least does not close, then the series control circuit remains open.

Therefore if at least one of the power switches opens up, then the at least respective control switch opens up too and the series control circuit gets open.

Optionally, at least an additional auxiliary control switch may be inserted in the series control circuit, said additional auxiliary control switch being adapted to signal an availability of one or more control signals for the switchgear. Thus, if the additional auxiliary control switch or switches has/have tripped, the series control circuit is then broken.

In an embodiment, the wind turbine facility power supplying arrangement comprises:
  a first electrical power supply path and three parallel electrical power supply paths, and
  a first power switch and three parallel power switches.

In this embodiment, each of the power supply paths is breakable by one of the four power switches.

For example, the wind turbine facility power supplying arrangement may comprise four control switches, each of the control switches being arranged to signal a state of operation of respectively one of the four power switches.

In another embodiment of the invention, there is provided a wind turbine facility switchgear power supply controlling system, the controlling system comprising:
  a wind turbine facility power supplying arrangement according to any embodiment of the invention,
  at least one control arrangement arranged so as to be able at least to carry out one of:
    opening and closing the power switches;
    determining the status of the series control circuit.

The control unit may be a separate control unit or it may form part of a more overall control system controlling the overall operation of a wind turbine facility.

In an embodiment of the invention, the wind turbine facility switchgear power supply controlling system comprises, when comprising the control arrangement arranged so as to determine the status (broken or conductive) of the series control circuit, an alarm signal generator able to generate an alarm signal based on the status broken of the series control circuit.

In this embodiment, an alarm signal is generated if the redundancy of the power supply to the switchgear is either broken or reduced. Said series control circuit is then monitoring the plurality of parallel power switches on the power supply paths that may feed power to the switchgear in a redundant manner.

Then for example, if at least one of the power switches trips off (i.e. gets open) when it is expected to be closed (conductive), the wind turbine facility switchgear power supply controlling system detects the status broken of the series control circuit.

If the controlling system comprises an alarm signal generator, then the controlling system generates an alarm signal (for example a telecommunication or data signal to a distant monitoring centre) to alert, for example the operator of the wind turbine facility or the maintenance service team, of the tripping of the at least one of the power switches.

In another example, when the power switches are ordered to close in order to power the switchgear, if at least one of the power switches does not close, the wind turbine facility switchgear power supply controlling system detects the status broken of the series control circuit.

If the controlling system comprises an alarm signal generator, then the controlling system generates an alarm signal (for example a telecommunication or data signal to a distant monitoring centre) in order to alert, for example the operator of the wind turbine facility or the maintenance service team, of the non closure of the at least one of the power switches.

When there is a bad functioning power switch, it can be then either replaced or either repaired. But in the mean time, the switchgear is powered when needed thanks to the other power supply path(s).

In another embodiment of the invention, there is provided a wind turbine facility switchgear system, the switchgear system comprising:
 a wind turbine facility switchgear power supply controlling system according to any embodiments of the invention,
 at least one switchgear,
wherein the first electrical power supply path and the at least another parallel electrical power supply path are electrically connected at least to the switchgear.

In an example, when there are four electrical power supply paths, and the switchgear comprise two sets (a first and second one) of a motor and a trip coil, the electrical connection between the electrical power supply paths and the switchgear is arranged so that:
 an electrical power supply path is electrically connected to the motor of the first set,
 another electrical power supply path is electrically connected to the trip coil of the first set,
 another electrical power supply path is electrically connected to the motor of the second set, and
 another electrical power supply path is electrically connected to the trip coil of the second set.

In an embodiment of the invention, the wind turbine facility switchgear system further comprises at least a source of electrical power.

This source of electrical power is powering at least a wind turbine facility power supplying arrangement according to the invention.

In an embodiment, the source of electrical power is at least one of:
 a power storage device (for example a battery, an UPS (uninterruptible Power Supply), a fly wheel, or any equivalent device for the skilled man in the art);
 an electrical interface system able to be connected to an electrical grid to provide electrical power to the wind turbine facility switchgear system through any wind turbine facility power supplying arrangement according to the invention (for example, at least one of a transformer or a rectifier for generating a DC voltage from an associated AC grid (rectification of AC power and the appliance of rectified AC power for powering elements of the switchgear may be applied during normal operation) or any equivalent device for the skilled man in the art);
 an electrical power generator (like at least one of a solar panel, a diesel generator or any equivalent device for the skilled man in the art).

In a preferred embodiment, the source of electrical power is a system comprising a rectifier for generating a DC voltage from an associated AC grid and a power storage device, the rectifier and the power storage device being arranged so that:
 when the AC grid is providing power at a certain predefined quality level according to at least a certain predefined parameter (for example at least one of voltage, intensity, frequency or the like), the rectifier provides the electrical power to:
  1) a power supply arrangement according to the invention and
  2) to the power storage device in order to been able to charge it if needed (it can be noted that in an embodiment, the supplying to the power supply arrangement from the rectifier may be done through the power storage device and in another embodiment, the rectifier and the power storage device are arranged so that the rectifier feeds directly the power supply arrangement and the power storage device when the AC grid is providing power according to at least a certain predefined parameter);
 when the AC grid is faulty (i.e. it is not providing power at a certain predefined quality level according to at least a certain predefined parameter (at least one of voltage, intensity, frequency or the like), the power supply device provides the electrical power to the power supply arrangement according to the invention.

In another embodiment, there is provided a wind turbine facility comprising the wind turbine facility power supplying arrangement for supplying electrical power according to the invention, the wind turbine facility switchgear power supply controlling system according to the invention or the wind turbine facility switchgear system according to the invention. Again, the term wind turbine facility should be understood broadly and covers, thus, for example a single wind turbine or, alternatively, a group of wind turbines forming a wind power plant.

If for any reason, one of the power switches does not work properly, for example is not close properly when it should be closed, electrical power is still supplied via the at least other power supply path to the switchgear, enabling therefore the switchgear to disconnect the wind turbine facility, when it is connected to an electrical grid, from said grid it is connected to. Other actions can be taken, like closing down the wind turbine for security reasons until the faulty power switch is either replaced or fixed, or requesting maintenance on the faulty power switch (through for example an alarm signal).

BRIEF DESCRIPTION OF THE DRAWINGS

The present invention will now be explained in further details with reference to the accompanying figures, where.

DETAILED DESCRIPTION OF THE INVENTION

Figure 1A:
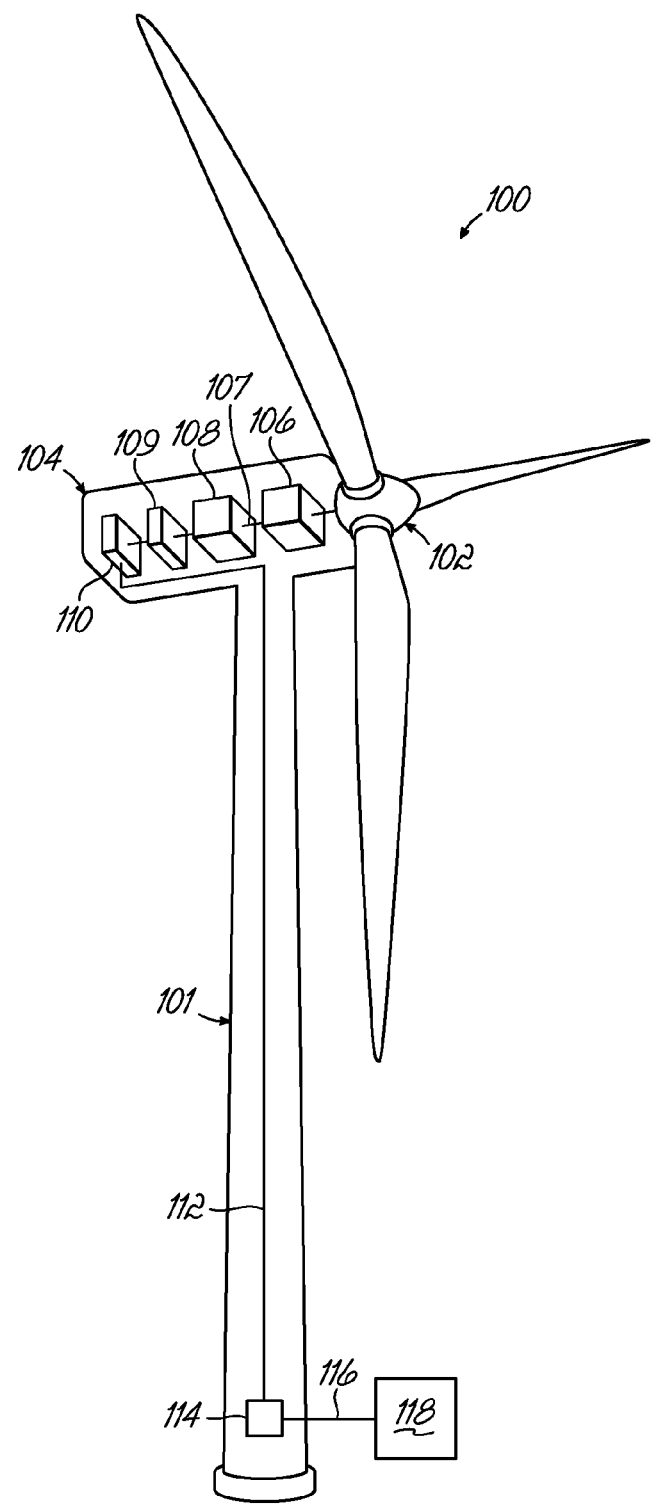
FIG. 1A illustrates a schematic view of a wind turbine.

In the following, the same reference numeral may be applied in connection with equivalent features of the various embodiments disclosed.

Figure 1B:
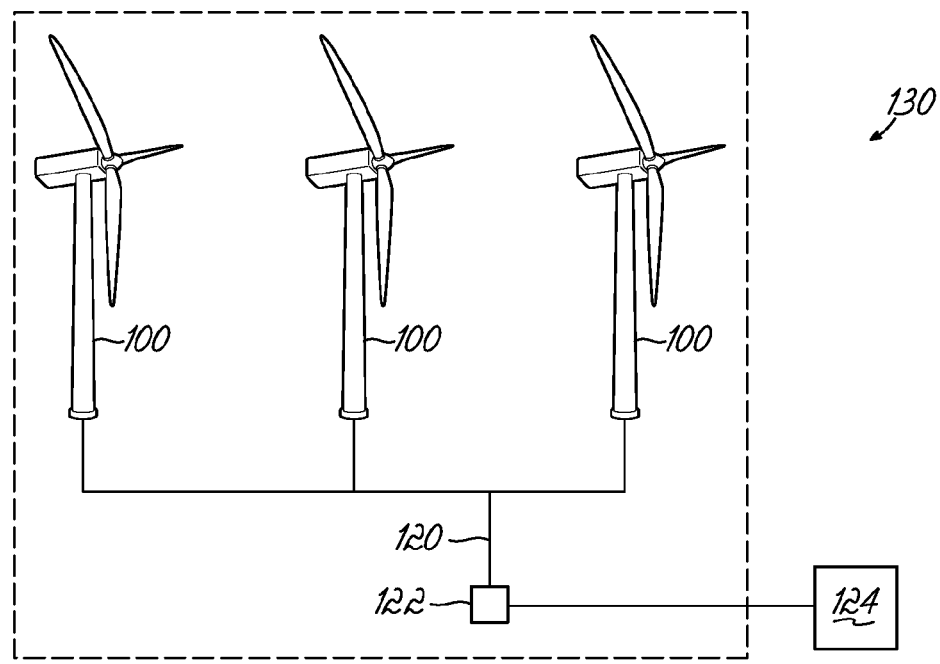
FIG. 1B illustrates schematic view of a wind turbine park.

FIG. 1A and FIG. 1B are two schematic examples of wind turbine facilities.

With reference to FIG. 1A, the wind turbine facility example is a wind turbine 100 comprising a rotor 102, a nacelle 104 and a tower 101. This wind turbine rotor 102 captures the energy and rotates because of the wind. This rotational movement of the rotor 102 is transmitted to an electrical generator 108 to generate electrical power thanks to a shaft 107. Optionally, the rotational speed of the rotor 102 may be changed in a gear box 106 depending on the design of the wind turbine 100. The electrical generator 108 transforms the rotational energy of the shaft 107 in electrical power. Optionally, the electrical power goes through a converter 109 that may correct the frequency of the electricity coming out of the generator 108.

Then the voltage of the electricity may be increased in a transformer 110 that may be either in the nacelle 104, in the tower 101 or nearby.

In the example of FIG. 1A, the wind turbine 100 is equipped with switchgear 114 for allowing the disconnection from an associated electrical grid 118. During normal operation the generated power is injected into the associated grid 118 through the connection 116. However, it may be necessary to disconnect the wind turbine 100 from the associated grid 118 in emergency situations in order to protect the wind turbine 100 or service personnel during for example maintenance service of the wind turbine 100, or when problems occur in the associated grid 118.

With reference to FIG. 1B, the wind turbine facility example is a wind turbine park 130 comprising a set of wind turbines 100. These wind turbines feed together a power plant grid 120 that is interfaced to a main electrical grid 124 through switchgear 122. In this case, the switchgear 122 allows the disconnection of the wind turbine park 130 if needed.

Other example of wind turbine facilities will be apparent to the skilled man in the art.

But independently of the type of the wind turbine facility the switchgear is placed in order to provide the disconnection of the wind turbine facility from a grid. Said switchgear contains one or more protection relay(s), motor(s) and/or a trip coil (s).

In general, switchgear interface of a wind turbine facility allows tripping of switchgear when demands so require. A trip of the switchgear is performed notably by supplying energy in the form of electric power to the tripping coil(s) of the HV switchgear.

One of the challenges in designing switchgear interfaces to a wind turbine control unit is to enable quick activation of the switchgear for safety reasons. For example, the arc detector system or the safety system of a wind turbine may generate trip signals to the switchgear to disconnect the wind turbine from the grid. Although such a system may provide quick activation of a tripping coil(s) in the switchgear when needed, there is also a risk that the switchgear may not trip when requested because for example, the power supply for the protection relay in the switchgear is disconnected.

If there is one power switch, for example a miniature circuit breaker (MCB), protecting the motors and tripping coils in the switchgear, it may trip without the right selectivity (i.e. when it shouldn't have done). And this questions the reliability of the system.

Figure 2:
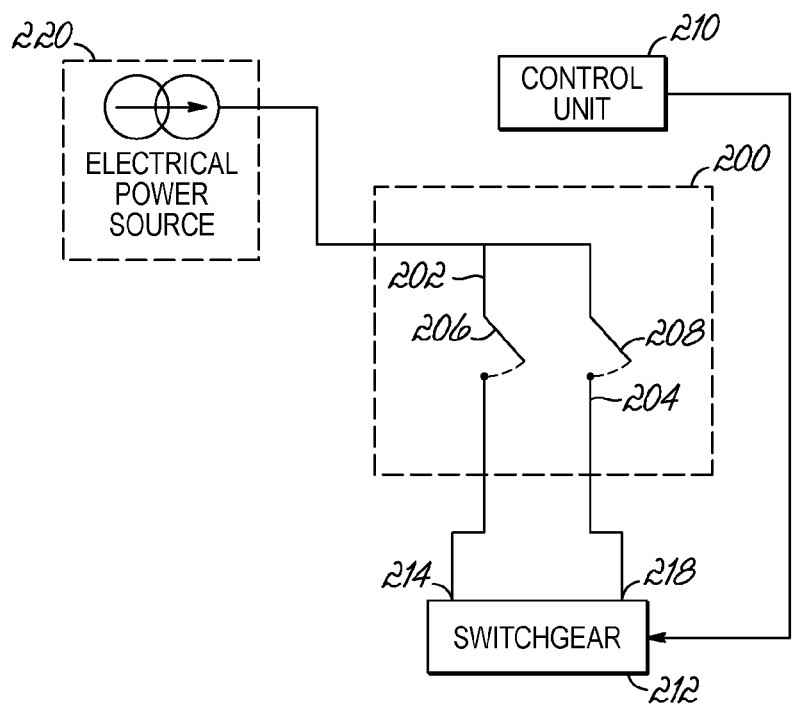
FIG. 2 illustrates an embodiment of the present invention.

With reference to FIG. 2, an embodiment of the invention is illustrated schematically. A power supply arrangement 200 comprises one first power supply path 202 and one parallel power supply path 204.

The first power supply path 202 is breakable with a first power switch 206. The parallel power supply path 204 is breakable with a parallel power switch 208. The power switches may be protection switches for the switchgear. The switches may trip automatically, manually and/or they switches may be controlled by the control unit 210.

In this example, the power switches are miniature circuit breakers protecting the motors and coils of the switchgear.

The power supply arrangement is connected on one side to an electrical power source 220 and on the other side to the switchgear 212 thought the connectors 214 and 218.

When the switchgear 212 tripping is wanted, the control unit 210 sends a signal for ordering the tripping.

In order for the tripping to take place, the switchgear needs to be powered.

If, because of unforeseen circumstances, one of the two power switches 206, 208 is open then, then the power supply for the switchgear flows through the one that is still closed, and the switchgear get powered through one of the connectors 214 and 218 linked to the power switch still closed.

The redundancy in the supply power paths increases then the chances of the switchgear (and notably its tripping coils) getting power supply. If there is only one power supply path, then if the corresponding power switch is open when the switchgear is requested to trip, then the switchgear does not get any power supply, and therefore can not trip: this situation is dangerous.

Figure 3:
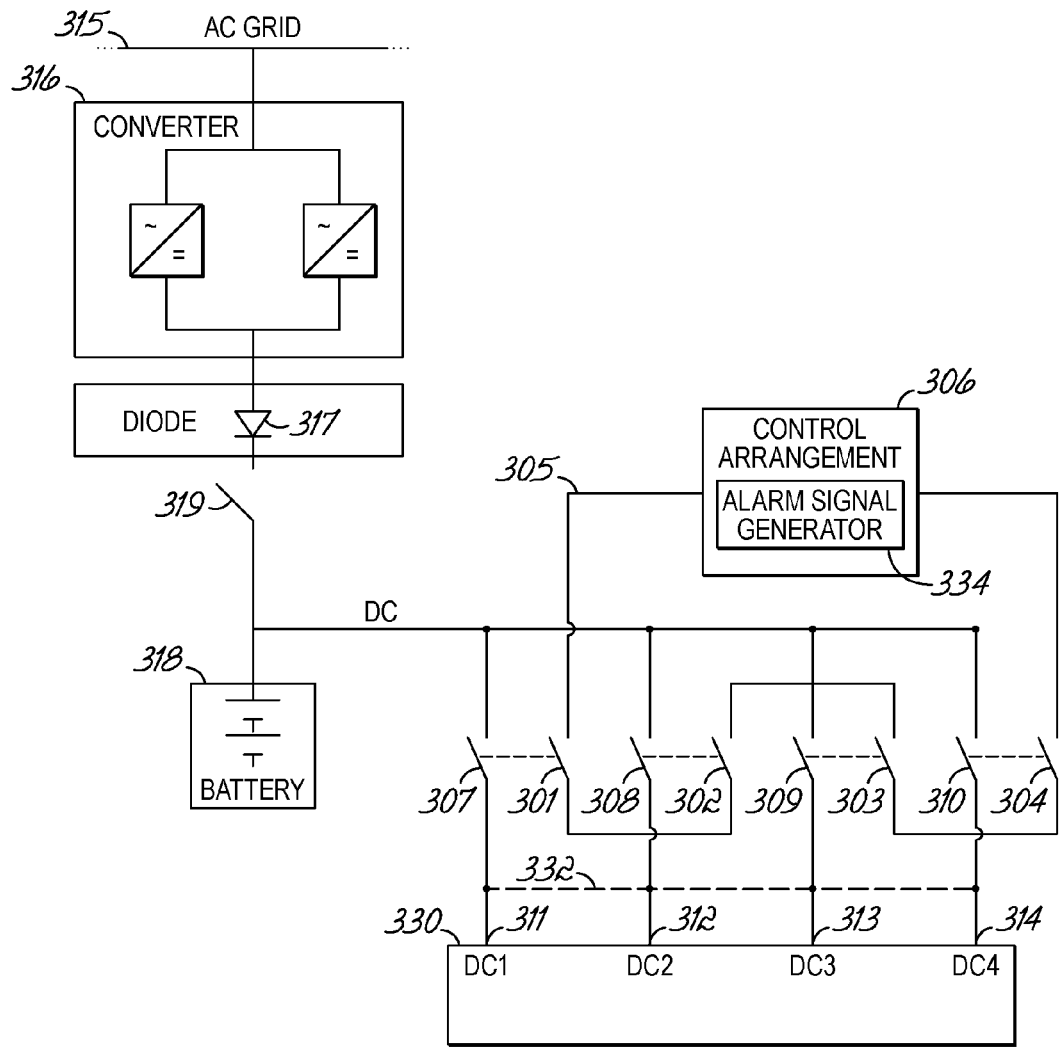
FIG. 3 illustrates another embodiment of the present invention.

FIG. 3 shows schematically another embodiment of the invention.

A wind turbine facility switchgear system according to an embodiment of the present invention is depicted. As shown in FIG. 3, four control switches 301-304 are connected in series whereby a loop-shaped series control signal path 305 is formed. Both ends of the loop-shaped path 305 are operatively connected to the wind turbine control system 306. Each of the control switches 301-304 signals the state of operation of the power switches 307-310 arranged in parallel. Thus, if for example one power switch, for example 307, trips (going from the status closed to the status open), the corresponding auxiliary control switch, in this example 301, trips as well.

When all power switches 307-310 are conducting, four independent DC power supply paths 311-314 are provided in this embodiment to the switchgear 330. Such elements may be for example motors, tripping coils, protections or relays. In this particular example, the switchgear 330 comprises two sets (a first and second one) of a motor and a trip coil, the electrical connection between the electrical power supply paths and the switchgear is arranged so that:

the electrical power supply path 311 is electrically connected to the motor of the first set in DC1,
the electrical power supply path 312 is electrically connected to the trip coil of the first set in DC2,
the electrical power supply path 313 is electrically connected to the motor of the second set in DC3 and
the electrical power supply path 314 is electrically connected to the trip coil of the second set in DC4.

Optionally, the power supply paths 311-314 (or at least some of them) are electrically linked, for example by an electrical link 332 between the switch gear 330 and the power switches 307-310 and/or by internal link(s) provided in the switchgear 330.

Concerning the electrical power that is supplied to the switchgear, in one embodiment, the power supply for the switchgear 330 is provided in various ways with direct current. During normal operation, electrical power can be drawn from an AC grid 315 via a suitable converter 316 that can be redundant, and a diode 317. If there is no access to the AC grid or the quality of the electrical grid is not good enough compared with some predefined parameters (for example if at least one of voltage, intensity and frequency provided is outside a predefined range) electrical power may be drawn from a power storage device, such as a battery 318. The power storage device may advantageously be charged via the converter 316 and the diode 317 during normal operation (the diode 317 avoids the electrical energy to flow upstream towards the converter 316. The state (connected or disconnected) of a controllable switch 319 determines whether DC power is to be provided from the AC grid (via the converter 316) or from the power reservoir 318.

Concerning the electrical power that is supplied to the switchgear, in another embodiment, the power supply for the switchgear 330 is provided in various ways with alternate current (AC). During normal operation, electrical power can be drawn from an AC grid 315 via a suitable transformer. If there is no access to the AC grid or the quality of the electrical grid is not good enough compared with some predefined parameters (for example if at least one of voltage, intensity and frequency provided is outside a predefined range) electrical power may be drawn from a power storage device, such as a battery 318, trough an inverter. The power storage device may advantageously be charged via the transformer during normal operation. The state (connected or disconnected) of a controllable switch 319 determines whether DC power is to be provided from the AC grid (via the converter 316) or from the power reservoir 318. The switchgear may then contain a rectifier, to transform the AC current provided to it into DC current.

Also, regardless of a power supply done in AC or DC, with the required inverters and or converters, the power storage device is in another embodiment in series between the AC grid and an embodiment of the power supply arrangement so that the electrical energy flows through the power storage device to the embodiment of the power supply arrangement in normal operation.

If a power switch 307-310 opens (or respectively a power switch is not closed properly when required), the corresponding control switch opens as well (the corresponding control switch respectively is not closed also as well). Since the control switches are coupled in series, an open control switch breaks the series connection whereby the control arrangement 306 is signalled about the open power switch. The control system 306 may then take necessary precautions which may include at least one of a controlled close down of the wind turbine facility or the generation of an alarm thanks to an optional alarm signal generator 334.

In one embodiment, this alarm signal generator 334 can be a data generator that will send the data with other wind turbine facility data to a distant monitoring system.

In this embodiment, a total of four control switches 301-304 are connected in series. Each of these control switches 301-304 signals the state of operation of one associated power switch 307-310, said associated power switch being coupled in parallel with three other power switches to ensure redundancy in the power supply to the switchgear.

In the embodiment depicted in FIG. 3 the control arrangement could be independent for each signal or group of signals instead of grouping them in series.

Figure 4:
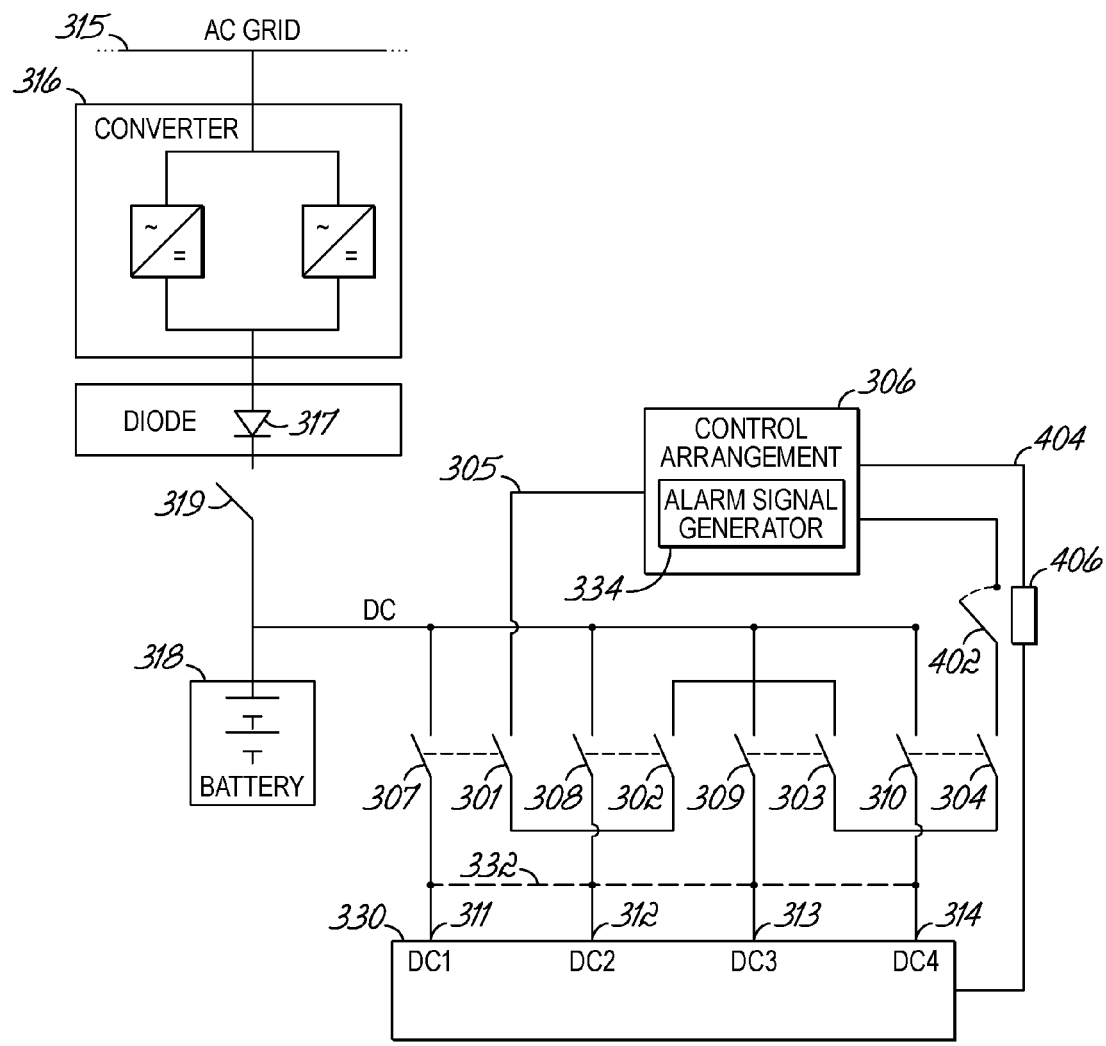
FIG. 4 illustrates another embodiment of the present invention.

FIG. 4 shows schematically another embodiment of the invention. This embodiment is similar to the one of FIG. 3 and it is subjects to at least of the variants described above, but also has got an auxiliary control switch 402 coupled to fault detection device 406 checking the availability of a control signal that, in this embodiment, goes through the circuit 404 from the control arrangement 306 and the switchgear 330.

A fifth auxiliary control switch (not shown) may control the availability of control signals, such as control signals for the protection relay. If the fifth control switch has tripped an alarm signal is generated by the control unit.

When the fault detection device 406 detects a problem in the control signal going through the path 404, the auxiliary control switch 402 is opened and therefore the control circuit 305 gets then broken. The control arrangement 306 then detects a problem and may generate an alarm thanks to the optional alarm signal generator 334.

The control unit 210 and control arrangement 306 for the embodiments described above, may comprise any electrical control apparatus, such as a computer, configured to control one or more variables based upon one or more inputs.

The control unit 210 and control system 306 can be implemented using one or more processors selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog and/or digital) based on operational instructions that are stored in a memory.

The memory may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing digital information.

The control unit 210 and control arrangement 306 may include a human machine interface (HMI) operatively connected to the processor in a conventional manner. The HMI may include output devices, such as alphanumeric displays, a touch screen, and other visual indicators, and input devices and controls, such as an alphanumeric keyboard, a pointing device, keypads, pushbuttons, control knobs, etc., capable of accepting commands or input from the operator and transmitting the entered input to the processor.

The processor of control unit 210 operates under the control of an operating system, and executes or otherwise relies upon computer program code embodied in various computer software applications, components, programs, objects, modules, data structures, etc. to control the switchgear 212, whether implemented as part of the operating system or as a specific application.

Similarly, the processor of control system 306 operates under the control of an operating system, and executes or otherwise relies upon computer program code embodied in various computer software applications, components, programs, objects, modules, data structures, etc. to monitor the control switches 301-304, and optionally, if they are included, the fault auxiliary control switch 402 and to react to a power switch failure or, when implemented, to a lack of availability of a control signal for the switchgear 330, whether implemented as part of the operating system or as a specific application. The computer program code typically comprises one or more instructions that are resident at various times in the processor memory, and that, when read and executed by the processor, causes the control unit 210 and control system 306 to perform the steps necessary to execute steps or elements embodying the various aspects of the invention.

While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims. Notably, some features described in previous embodiments of the invention can be mixed with other embodiments of the invention according to the knowledge of the skilled man in the art.

The invention claimed is:

1. A wind turbine facility power supplying arrangement for supplying electrical power to a power supply of a switchgear, said switchgear being able to isolate the wind turbine facility from an electrical network, the wind turbine facility power supplying arrangement comprising:
    a first electrical power supply path configured to provide electrical power to the power supply of the switchgear;
    a first power switch configured to break said first electrical power supply path;
    at least one parallel electrical power supply path configured to provide electrical power to the power supply of the switchgear and further configured to be breakable by at least one respective parallel power switch; and
    a plurality of control switches, wherein each control switch is configured to be open when a respective one of the power switch and parallel power switch is open and closed when a respective one of the power switch and parallel power switch is closed.

2. The wind turbine facility power supplying arrangement according to claim 1, wherein the plurality of control switches are configured in a series control circuit.

3. The wind turbine facility power supplying arrangement according to claim 1, further comprising at least an additional auxiliary control switch in the series control circuit, said additional auxiliary control switch being configured to signal an availability of at least one control signal for the switchgear.

4. The wind turbine facility power supplying arrangement according to claim 1, wherein the at least one parallel electrical power supply path comprises three parallel electrical power supply paths each having a parallel power switch, and each of the parallel electrical power supply paths is breakable by a respective one of the three parallel power switches.

5. The wind turbine facility power supplying arrangement according to claim 4, further comprising four control switches and four electrical power supply paths, each power supply path being breakable by one of the four power switches.

6. A wind turbine facility switchgear power supply controlling system, comprising:
    a wind turbine facility power comprising:
        a first electrical power supply path configured to provide electrical power to the power supply of the switchgear;
        a first power switch configured to break said first electrical power supply path;
        at least one parallel electrical power supply path configured to provide electrical power to the power supply of the switchgear and further configured to be breakable by at least one respective parallel power switch;
        a plurality of control switches, wherein each control switch is configured to be open when a respective one of the power switch and parallel power switch is open and closed when a respective one of the power switch and parallel power switch is closed;
    and
    a control arrangement configured to carry out at least one of opening and closing the power switches, and determining a status of the series control circuit.

7. The wind turbine facility switchgear power supply controlling system according to claim 6, further comprising, when comprising the control arrangement configured to determine the status of the series control circuit, an alarm signal generator configured to generate an alarm signal upon determining the status of the series control circuit is broken.

8. A wind turbine facility switchgear system, comprising:
    a wind turbine facility switchgear power supply controlling system according to claim 6; and
    a switchgear,
    wherein the first electrical power supply path and the at least another parallel electrical power supply path are electrically coupled to the switchgear.

9. The wind turbine facility switchgear system according to claim 8, further comprising a source of electrical power.

10. The wind turbine facility switchgear system according to claim 9, wherein the source of electrical power is at least one of:
    a power storage device,
    an electrical interface system configured to be coupled to an electrical grid to provide electrical power to the wind turbine facility switchgear system, and
    an electrical power generator.

11. A wind turbine facility having a power supplying arrangement for supplying electrical power to a power supply for a switchgear, said switchgear being able to isolate the wind turbine facility from an electrical network, the facility comprising:
    a first electrical power supply path configured to provide electrical power to the power supply of the switchgear;
    a first power switch configured to break said first electrical power supply path; at least one parallel electrical power supply path configured to provide electrical power to the power supply of the switchgear;
    at least another respective parallel power switch configured to break the at least one parallel electrical power supply path; and
    a plurality of control switches, wherein each control switch is configured to be open when a respective one of the power switch and parallel power switch is open and closed when a respective one of the power switch and parallel power switch is closed.

12. The wind turbine facility according to claim 11, wherein the plurality of control switches are arranged in a series control circuit the wind turbine facility further comprises a control arrangement configured to carry out at least one of opening and closing the power switches, and determining a status of the series control circuit.

13. The wind turbine facility according to claim 12, further comprising the switchgear, wherein the first electrical power supply path and the at least another parallel electrical power supply path are electrically coupled to the switchgear.

* * * * *